United States Patent [19]

Ibanez et al.

[11] Patent Number: 4,560,016

[45] Date of Patent: Dec. 24, 1985

[54] METHOD AND APPARATUS FOR MEASURING THE WEIGHT OF A VEHICLE WHILE THE VEHICLE IS IN MOTION

[75] Inventors: Paul Ibanez, Woodland Hills; John Stoessel, Santa Monica; Donald C. Barrett, Venice, all of Calif.

[73] Assignee: Anco Engineers, Incorporated, Culver City, Calif.

[21] Appl. No.: 561,209

[22] Filed: Dec. 14, 1983

[51] Int. Cl.$^4$ .................. G01G 3/14; G01G 19/52; G01G 19/02; G02B 5/14

[52] U.S. Cl. .................. 177/210 R; 177/132; 177/134; 177/DIG. 6; 250/227; 73/800

[58] Field of Search ............ 177/210 R, 132, 134, 177/177, 178, DIG. 6; 250/227; 350/96.15; 73/800

[56] References Cited

U.S. PATENT DOCUMENTS

| | | |
|---|---|---|
| 3,305,036 | 2/1967 | Walters ............... 177/208 X |
| 3,782,486 | 1/1974 | Kuhn et al. ............ 177/210 C |
| 4,294,513 | 10/1981 | Nelson et al. ........ 350/96.15 X |
| 4,342,907 | 8/1982 | Macedo et al. .............. 250/227 |
| 4,421,979 | 12/1983 | Asawa et al. ............. 73/800 X |
| 4,449,210 | 5/1984 | Myer ................. 350/96.29 X |
| 4,451,730 | 5/1984 | Brogardh et al. .............. 250/227 |
| 4,459,477 | 7/1984 | Asawa et al. .................. 250/227 |

Primary Examiner—George H. Miller, Jr.
Attorney, Agent, or Firm—Thomas I. Rozsa

[57] ABSTRACT

The present invention relates to an inexpensive, portable, and accurate method and apparatus for calculating the weight of a vehicle while it is in motion. The apparatus to which the present invention relates is in the field of Weigh-In-Motion devices.

In the present invention, an optical fiber is embedded into a matrix such as a rubber pad and a multiplicity of microbending fixtures are distributed along the path of the optic fiber. Then as the wheels of a vehicle pass over the pad the force of the wheels cause the microbending fixtures over which they pass to pinch together and attenuate the light which is transmitted through the optic fiber. The light transmitted through the optic fiber from a light source at one end of the optic fiber is received by a light receiver at the other end of the optic fiber. Then by measuring the amount of light input and the net amount of light output, and calibrating the device, the weight of each axle and the weight of the vehicle above that axle can be measured. By successively measuring the weight of each such axle and its associated portion of the vehicle as it passes over the pad, the combined weight of the axles can be linearly added together to arrive at the total weight of the vehicle.

12 Claims, 7 Drawing Figures

METHOD AND APPARATUS FOR MEASURING THE WEIGHT OF A VEHICLE WHILE THE VEHICLE IS IN MOTION

BACKGROUND OF THE INVENTION

1. Field of the Invention

The present invention relates to a method and apparatus for measuring the weight of a vehicle while the vehicle is in motion. The present invention incorporates a simple, low cost portable device for weighing vehicles that also does not require the vehicles to stop during the weighing process. The apparatus to which the present invention relates is in the field of Weigh-In-Motion devices.

2. Description of the Prior Art

Weigh-In-Motion devices are particularly applicable for weighing a moving truck while it travels down a road. At present, trucks are weighed in weighing stations. The use of weighing stations poses several problems: (1) They are easily visible which allows truckers to avoid them; (2) They are very costly to build and operate; (3) Their use slows truck traffic severely; and (4) All trucks must pass over the scale as it is impossible to distinguish between loaded and overloaded trucks prior to weighing.

The alternative approach to the weigh station is a Weigh-In-Motion device. There are several such devices in application at the present time. Conceptually, the technologies presently used in Weigh-In-Motion devices are as follows:

(1) STRAIN GAUGE—Several types and configurations are possible including capacitance and resistance gauges of the weldable or adhesive bonded type. Typically, the strain, resulting from the application of an unknown force such as a truck, is applied to a plate or beam and then measured. The force is calculated from the known bending characteristics of the beam or plate.

(2) PIEZOELECTRIC—In this application, a mechanical or pneumatic force is applied to a crystal and this produces a rate proportional charge. The charge is converted to voltage by a charge amplifier and this is used to measure weight.

(3) CAPACITANCE—Parallel plate capacitors exhibit approximately linear changes in total capacitance as the plate spacing changes. The change in capacitance is related to the applied force by a spring rate. This typically requires a high frequency excitation for a reliable output.

(4) LINEAR VARIABLE DIFFERENTIAL TRANSFORMER—These typically consist of a linear transformer with a moveable core. As the core is displaced by the bending of a beam or plate under load, the output voltage of the transducer varies proportionally due to changes in inductance. These further require a carrier amplifier for signal conditioning. There are several major drawbacks to prior art devices which embody the above enumerated concepts. In most cases, the force measuring lattice, whether it be Strain Gauge, Piezoelectric, or Linear Variable Differential Transformer type, must be embedded in the road. The Capacitance type may lay over the roadway but is relatively thick, for example greater than ½ inch, and can distort the measurements due to wheel dynamics. This requires a high initial cost to install such a device. In addition, must devices are not readily portable. If the device is moved to another location, there is a considerable expense involved in repairing the road after removal. In the event a problem arises with the device, it requires a significant effort to remove the device for repair and this further restricts the use of the highway or other roadway while that portion of the road is torn up to repair or replace the device. In addition, available devices are relatively costly ($20,000.00 to $200,000.00).

There are several prior art United States patents which address the subject of Weigh-In-Motion systems. They are as follows:

(1) U.S. Pat. No. 4,339,010 issued to Malikov, et. al. for "Apparatus For Weighing Transport Vehicles in Motion."

(2) U.S. Pat. No. 4,317,496 issued to Krause for "In Motion Weighing System."

(3) U.S. Pat. No. 4,049,069 issued to Tamamura et. al. for "Device For Weighing Running Vehicle."

(4) U.S. Pat. No. 3,835,945 issued to Yamanaka et. al. for "Device For Weighing Running Vehicle."

(5) U.S. Pat. No. 3,825,734 issued to Jacobs et. al. for "Monitor For Moving Vehicles."

(6) U.S. Pat. No. 3,679,011 issued to Hawver et. al. for ""Weighing Scale Assembly."

(7) U.S. Pat. No. 3,601,209 issued to Paelian for "Vehicle-Weighing System."

All of these prior art patents basically incorporate one or more of the above described measuring systems, with all of their attendant problems. The Malinkov et. al. patent embodies an apparatus for weighing transport vehicles in motion, wherein at least two measuring units are electrically connected with a recording unit, each comprising a load platform which bears on a dynametric pickup load cell at a supporting point and is connected to a supporting structure by means of four rods installed in pairs at two sides of the load platforms. The weight of the vehicle bears on the load platform which in turn bears on the load cell at a geometric point whose vertical displacement due to an arbitrary moment of forces acting upon the load platform causes a measurable deformation of the rods.

The Krause Patent is concerned with a system for weighing a plurality of coupled railroad cars. The system uses preselected photocell sensor units in an arrangement keyed to the cross section bulk of each car. The shape of the cars interrupts photocell signals at predetermined points on a weigh bridge, thereby actuating means at the precise point when each car is at the optimum weighing position on a scale.

The Tamamura et. al. patent discloses an apparatus for measuring the weight of a moving vehicle which includes a series of platforms with the length of each platform being shorter than the distance between the axles of the vehicle. The displacement of the platforms is converted to electrical signals and electronic averaging of the signals produced by the individual axle loads enables the measuring instrument to determine the weight of the vehicle.

The Yamanaka et. al. Patent discloses another device for electronically measuring the weight of a moving vehicle as it passes over a platform.

The Jacobs et. al. Patent discloses another apparatus for weighing vehicles through utilization of digital scales used in conjunction with load cells.

The Hawver Patent discloses an apparatus which measures the weight of a moving vehicle such as a railroad car through the use of a weigh bridge over which the vehicle passes. The load applied to the weigh bridge is imposed on load cells.

Finally, the Paelian et. al. Patent discloses an apparatus for weighing a moving vehicle through a plurality of adjacent but independent weighing platforms when the wheel passes over one or more of the weighing platforms.

Therefore, all of the known prior art embodies an application for weighing a moving vehicle which incorporates either weighing platforms, load cells, or a combination of the two. These can be used in conjunction with the previously described methods of strain gauge, piezoelectric, capacitance and linear voltage displacement transducer. These are usually bulky in construction and if incorporated into a system for measuring the weight of a vehicle such as a truck as it passes along a roadway, the system must be embedded into the roadway with all of the previously dicussed problems.

None of the prior art embodiments incorporate a simple, inexpensive, portable method and apparatus for weighing a vehicle in motion.

SUMMARY OF THE PRESENT INVENTION

The present invention relates to an inexpensive, portable, and accurate method and apparatus for calculating the weight of a vehicle while it is in motion. The apparatus to which the present invention relates is in the field of Weigh-In-Motion devices.

It has been discovered, according to the present invention, that if an optical fiber is embedded into a matrix such as a rubber pad and a multiplicity of microbending fixtures are distributed along the path of the optic fiber, then as the wheels of a vehicle pass over the pad the force of the wheels cause the microbending fixtures over which they pass to pinch together and attenuate the light which is transmitted through the optic fiber. The light transmitted through the optic fiber from a light source at one end of the optic fiber is received by a light receiver at the other end of the optic fiber. Then by measuring the amount of light input and the net amount of light output, and calibrating the device, the weight of each axle and the weight of the vehicle above that axle can be measured. By successively measuring the weight of each such axle and its associated portion of the vehicle as it passes over the pad, the combined weight of the axles can be linearly added together to arrive at the total weight of the vehicle.

It has also been discovered, according to the present invention, that if a multiplicity of approximately parallel optic fibers are utilized in the matrix and run the length of the matrix, as opposed to a single very long optic fiber which goes through a series of loops inside the matrix, then much shorter optic fibers can be used. This allows greater sensitivity per fiber.

It has also been discovered, according to the present invention, that if a single very long optic fiber is used and the optic fiber is woven into a series of loops which criss-cross each other into a grid pattern, then the locations where a portion of the optic fiber intersects another portion of the optic fiber can be used to pinch the fibers together when a force is exerted on the matrix or pad. Therefore, the use of microbending fixtures can be eliminated provided the amount of light attenuation at each intersection of the fiber on itself can be calibrated into the computer in the output transformer device which measures the total light attenuation along the fiber and therefore, through use of an equation, the total weight of the axle and wheels exerting the force on the pad.

It is therefore an object of the present invention to provide a simple and efficient method of measuring the weight of a vehicle in motion through calculation of the amount of light attenuation through an optic fiber when a force is exerted on a pad which contains the optic fiber.

It is another object of the present invention to cause the attenuation of the light through the optic fiber when a force is exerted on the optic fiber by a multiplicity of microbending fixtures located along the optic fiber which pinch together when a force is exerted on the pad and thereby attenuate the light which passes through the optic fiber at that location of the microbending fixture.

It is a further object of the present invention to cause the attenuation of the light through the optic fiber when a force is exerted on the pad in which the optic fiber is embedded by interweaving the fiber into a grid wherein portions of the optic fiber will intersect one another to thereby cause a pinching effect and attenuate the light passing through the optic fiber at the location of the intersection points when the force is applied to the pad.

It is yet another object of the present invention to replace one single very long and expensive optic fiber with a multiplicity of shorter and less expensive optic fibers to achieve the same measuring result.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 6 illustrates the shoe as worn by an individual with a measuring device worn on his back. Such a device can be used to measure shoe performance for athletic or orthopedic purposes.

DETAILED DESCRIPTION OF THE PREFERRED EMBODIMENT

The present invention relates to a novel method and apparatus for weighing vehicles in motion such as a truck traveling along a road. The present invention embodies a simple, low cost, and portable device for weighing vehicles while they are in motion.

In general, the present invention incorporates the use of one or more optic fibers which are embedded into a matrix which is made of material such as rubber. At numerous points, the optic fiber(s) passes through a discrete or distributed microbending fixture that pinches the fiber when pressure is applied to the matrix. This pinching reduces the efficiency of light transmission through the fiber. A light source transmits light at one end of the fiber and the amount of light transmitted at the other end of the fiber is measured by a standard fiber optics transceiver. The attenuation of the light can be measured by a display device such as an oscilloscope, a strip chart recorder, or a microprocessor.

The equation which governs the light attenuation relationship as it is compared to the weight of the vehicle is arrived at as follows:

The relationship between the light input, $I_I$, and output, $I_O$, is given by $$I_o = I_I \cdot (1-\delta_1) \cdot (1-\delta_2) \cdot (1-\delta_3) \ldots (1-\delta_N) \quad (1)$$

where $\delta_i$ is the attenuation caused by the ith microbending fixture, and N is the total number of fixtures. If the matrix which can be a rubber pad is relatively stiff, the $\delta_i$ is much less than unity. Then Equation 1 can be expressed as $$I_o = I_I \cdot (\delta_1 + \delta_2 + \delta_3 + \ldots + \delta_N) + \text{terms of order } \delta^2 \text{ and higher.}$$

$$I_o = I_I \left( 1 - \sum_{i=1}^{N} \delta_i \right) \quad (2)$$

The value of $\delta_i$ is given by $$\delta_i = CF_i \quad (3)$$

where $F_i$ is the total force acting on the area immediately surrounding the ith Fixture, and c is a calibration constant depending on fixture design, rubber stiffness, and fiber properties. Equations 2 and 3 combined yield $$I_o = I_1 \left( 1 - c \sum_{i=1}^{N} F_i \right)$$

or $$\sum_{i=1}^{N} F_i = \frac{1 - \frac{I_o}{I_i}}{c}$$

Assuming the width of the entire rubber pad is sufficiently narrow so that only one truck axle or car axle can pass over it at any given instant, then the sum of all forces acting on the pad is equal to the total axle weight, $W_A$. Therefore:

$$W_A = \left( 1 - \frac{I_o}{I_I} \right) / c$$

As all the quantities on the right can be measured, and "c" can be obtained by calibration, the present invention provides a direct measure of total axle weight.

With the concept and method of the present invention thus described, several detailed alternative embodiments of the present invention will now be described.

Figures 1, 2:
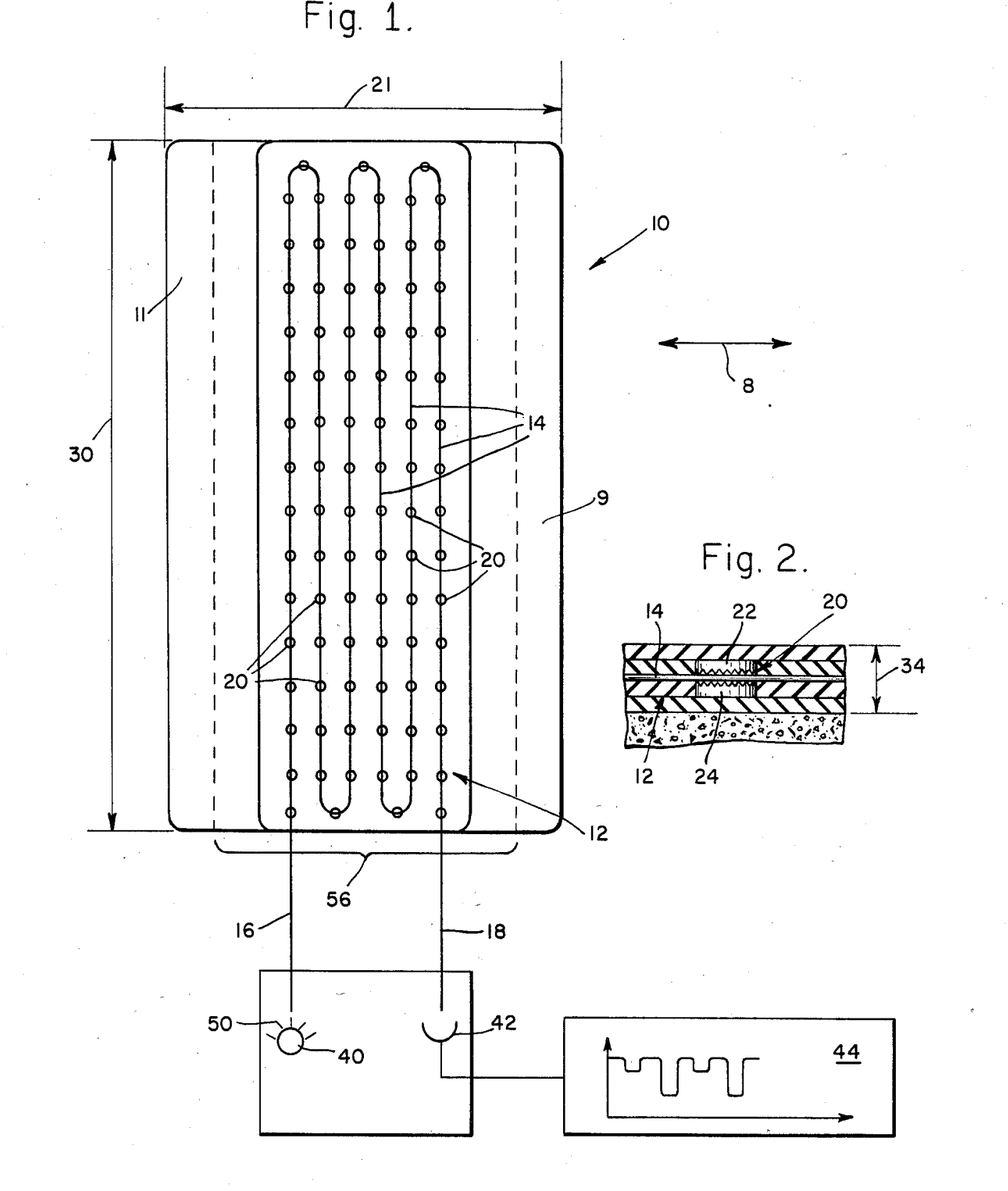
FIG. 1 is an open top plan view of one alternative embodiment of the Weigh-In-Motion apparatus of the present invention utilizing a single optic fiber and a multiplicity of discrete microbending fixtures.
FIG. 2 is a cross-sectional view of the embodiment of the Weigh-In-Motion apparatus illustrated in FIG. 1, taken along line 2—2 of FIG. 1

Referring particularly to FIG. 1, the present invention Weigh-In-Motion apparatus is disclosed at 10. The apparatus consists of a matrix 12 which by way of example can be a pad. One material out of which the pad 12 can be made is rubber. Embedded within the pad 12 is an optic fiber 14. The optic fiber is one continuous strip beginning at input end 16 located outside of the pad, 12, running the length of the pad and also the width of the pad by being bent into a series of loops, and then terminating at the output end 18 which is also located outside of pad 12. In the preferred embodiment, the input end 16 and the output end 18 of the optic fiber 14 are located at the same end of the pads 12. Located at a multiplicity of spaced locations along the length of the optic fiber 14 within the pad 12 are a multiplicity of microbending fixtures 20. An exploded view of one discrete microbending fixture 20 is disclosed in FIG. 2. The microbending fixture 20 consists of an upper toothed member 22 and a lower toothed member 24. Each microbending fixture 20 surrounds a portion of the optic fiber 14 so that the upper toothed member 22 rests above the optic fiber 14 and the lower toothed member 24 rests below the optic fiber 14. Therefore, when a force is applied to the pad 12, the upper and lower members of the microbending fixture 20 pinch together and thereby reduce the amount of light that can pass through the optic fiber 14.

In operation, the substantially flat rubber pad 10 is placed on a roadway. In the preferred embodiment, the length 30 of the pad 12 is approximately equal to the width of one lane of the roadway. The width 21 of the pad 12 which contains the embedded optic fiber 14 and associated microbending fixtures 20 can for example be approximately 18 inches wide. For convenience and ease of operation, the pad 12 can have a forward ramp 9 and a rearward ramp 11. The flow of traffic is depicted by the arrow 8. As shown in Figure two, by way of example, the height 34 of the pad 12 can be approximately one-half (½) inch.

The leading or input end 16 of the optic fiber 14 is connected to a light source 40. The trailing or output end 18 of the optic fiber is connected to a light receiver 42. The light receiver 42 is in turn connected to an Output Transformer Device 44 which transforms the attenuated optical signal received by the light receiver 42 into a calculated weight for the axle which has passed over the pad 12.

A vehicle such as a truck moves along the roadway in the direction indicated by the arrow 8. The truck passes onto the forward ramp 9, over the pad 12 and down the trailing ramp 11. The width 21 of the pad 12 is sufficiently narrow so that only one set of wheels on the given axle can pass over the pad 12 at any given instant. As the wheels on the axle pass over the pad, they exert a force on the pad which in turn causes the upper and lower members of the microbending fixtures over which the wheels have passed to pinch toward each other and attenuate the beam of light 50 which is transmitted through the optic fiber 14 from the light source 40. The effect on transmission will vary depending where on the optical fiber 14 the microbending fixtures 20 cause the light to be attenuated. As light 50 is attenuated, subsequent areas of the optical fiber see less light so there is less light to be attenuated by successive microbending fixtures. For an optional feature, each microbending fixture 20 can be calibrated into the computer within the output transformer device to assume that the amount of attenuation corresponds to the amount of net actual light 50 which that particular microbending fixture 20 sees.

It is necessary to have a large number of microbending fixtures 20 located along the path of the optical fiber 14 because the exact location where the wheels will run over the pad 12 is unpredictable and will certainly vary from vehicle to vehicle and also possibly from one set of wheels on a vehicle to the next set of wheels on the vehicle.

As previously described, the total weight of the axle carrying the wheels which have run over the pad 12 plus the weight of the vehicle over that axle is calculated by the formula:

$$W_A = \left(1 - \frac{I_o}{I_I}\right)/c$$

where $I_I$ is the amount of light input; $I_O$ is the attenuated amount of light input, and "c" is a calibration constant depending on microbending fixture design, pad material such as rubber stiffness, and optical fiber properties.

As each successive set of wheels on an axle runs over the pad, the corresponding weight of that full axle plus its overhead load is instantaneously calculated by the above method. After all of the axles have passed over the pad 12, the successive weights calculated for each axle are added up and the resultant is the total weight of the vehicle.

The present invention therefore provides a method and apparatus for measuring the weight of a moving vehicle which has many advantages over the prior art embodiments. First, there is no need to damage or tear up the roadway on which the Weigh-In-Motion device is placed. The pad 12 can be placed directly on the roadway and held secure with a few spikes placed adjacent its edges. In addition to ease of installation, the device can be easily removed and placed in another location very quickly. The Weigh-In-Motion device has no effect on slowing traffic since it is only approximately one-half of an inch high and contains leading and trailing ramps. Therefore, any vehicle can easily run over it. Since the entire fiber optic and microbending fixture unit is embedded within the rubber or other material pad, the Weigh-In-Motion device is durable and will have a long life. Through use of the present invention, the total axle forces and differences in tire footprint and pressure can be automatically integrated by calibrating the various microbending fixture units to the Output Transformer Device. Since the readout is directly in axle force, it is suitable for automatic measurement and microprocessing. Depending on how the microfixture devices are calibrated and connected to the computer in the Output Transformer Device, the present invention can be configured to read total or single wheel forces, or even multi-lane forces if the width of the device is extended to stretch across more than one lane. Calibration for rubber thickness and other properties of the pad can also be taken into account.

Figure 3:
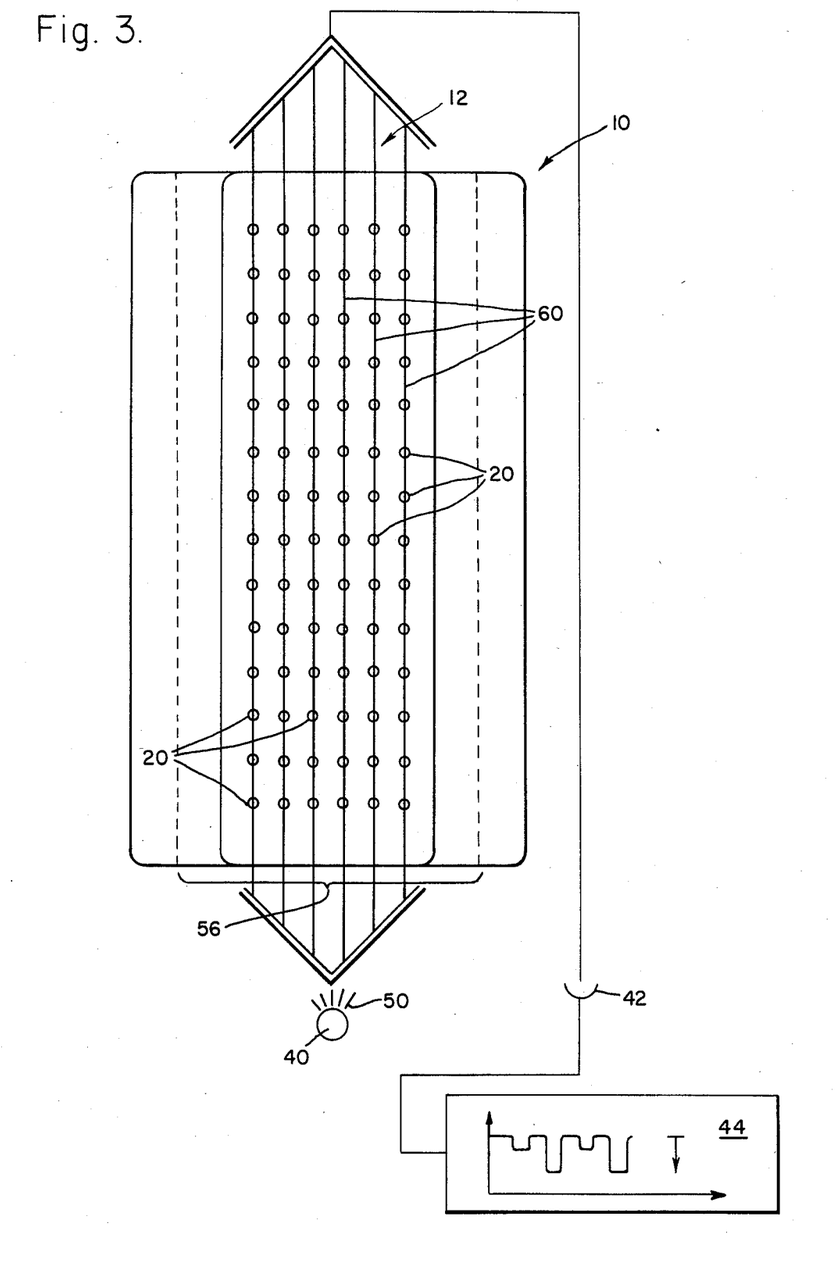
FIG. 3 is an open top plan view of a second alternative embodiment of the present invention disclosing a multiplicity of generally parallel optic fibers running the length of the pad and a multiplicity of microbending fixtures.

There are several alternative embodiments which can be used with the present invention. One such alternative embodiment is shown in FIG. 3. Instead of having one optical fiber which is very long and runs through several series or bends, there are a large number of individual optic fibers 60 which run the length of the pad 12 and are spaced apart from one another. By way of example, the number of such optical fibers 60 can be fifty. The advantage of this embodiment is that it shortens the path along which the light 50 must travel. Thus more pinching can occur per fixture and still keep the total attenuation sufficiently low to allow equation (2) to be valid.

Figures 4, 5:
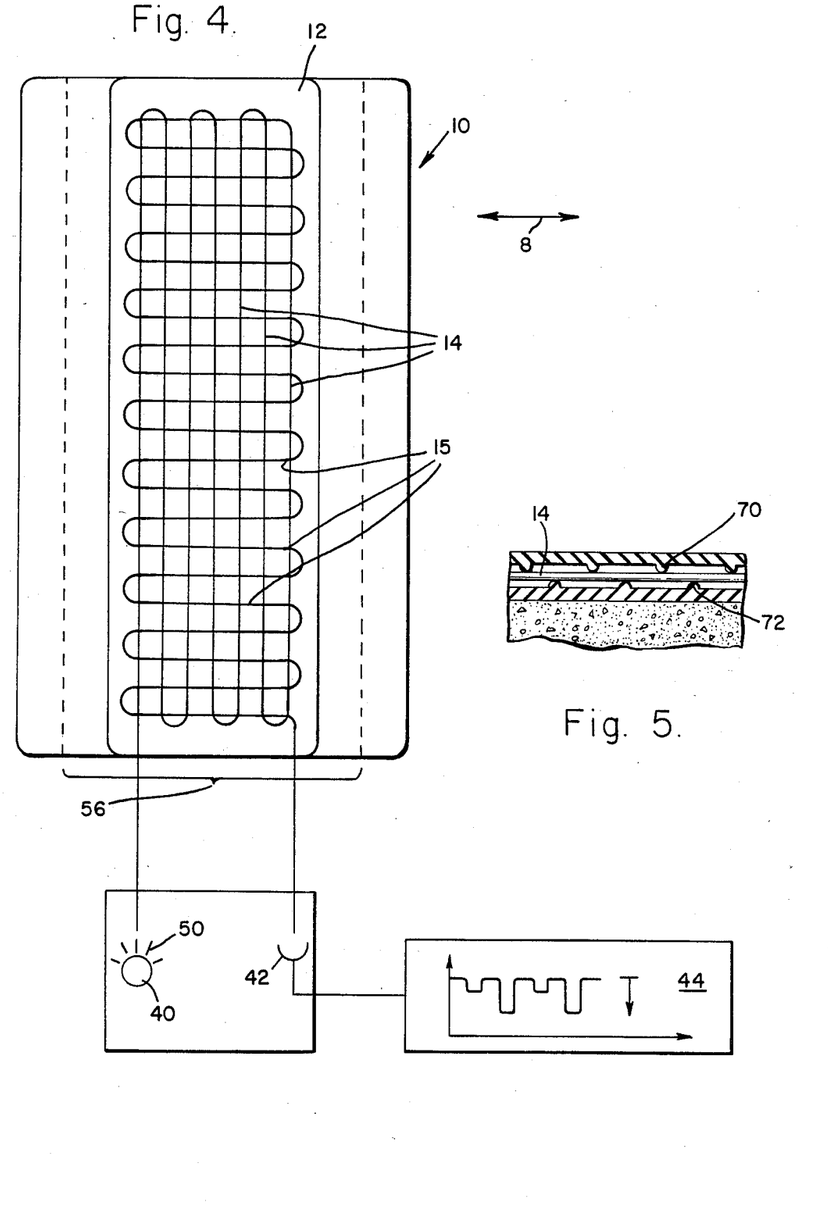
FIG. 4 is an open top plan view of a third alternative embodiment of the present invention disclosing a single optic fiber which is interwoven in a grid pattern both over and under itself.
FIG. 5 is an alternate concept to the use of the discrete microbending fixtures. It uses integral ridges in the upper and lower layers (made of a flexible but harder material such as hard rubber or vinyl) to pinch the fibre. The central resilient layer allows the compression and pinching.

Another alternative embodiment is shown in FIG. 4. In this embodiment, the microbending fixtures 20 have been eliminated entirely. As shown in FIG. 4, a single optic fiber 14 is woven over and under itself to form an interwoven grid which pinches itself. To assist in its formation, the shape of the grid can be cast into the lower portion of the rubber pad 12. In this embodiment, it is necessary to calibrate each of the numerous intersections 15 with the computer in the Output Transformer Device 44 in order to properly calibrate the attenuation of light at a particular intersection location.

An alternative embodiment to the discrete pinching fixtures is the distributed pinching fixture in FIG. 5. In this embodiment, the pinching event is created by a multiplicity of tongues or protrusions which are molded into the mat 12 along the path of the optic fiber. The upper tongues or protrusions 70 are offset from the lower tongues or protrusions 72 so that the optic fiber 14 receives a distributed pinching effect for light attenuation rather than the fixed location pinch effect previously described. The output transformer device 44 is once again calibrated to read this distributed light attenuation effect. A Data Trigger and Velocity Sensing System can be embedded in the leading and trailing ramps. This permits the light source 40, the light sensor 42, and the Output Transformer Device 44 to be turned on when the first such sensor is crossed by a wheel and turned off when the last such sensor is crossed by a wheel.

It is also important to note that although a microbending fixture 20 was shown in detail in FIG. 2, this is only one possible embodiment for such a structure and alternative embodiments are certainly within the spirit and scope of the present invention.

Figure 6:
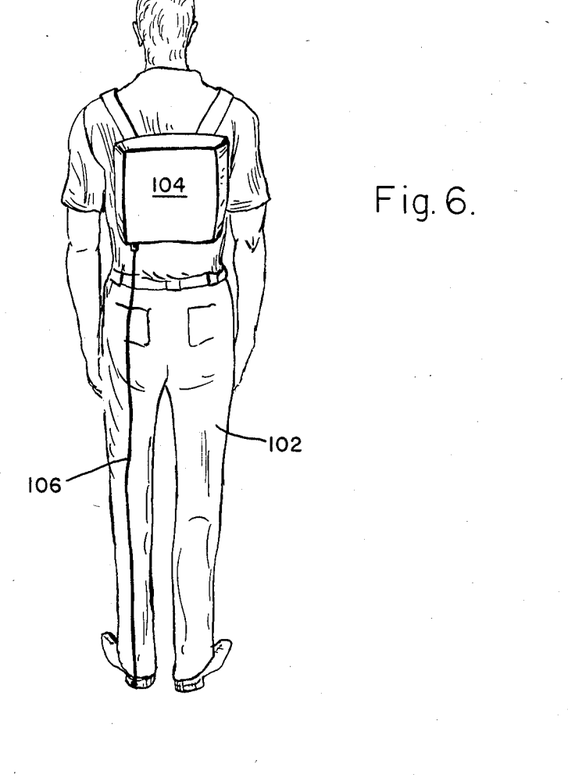
FIG. 6 is a perspective view of another application of the present invention wherein an optic fiber is embedded into the sole of a shoe and the measuring instrument is strapped onto the shoe wearer's back.
Figure 7:
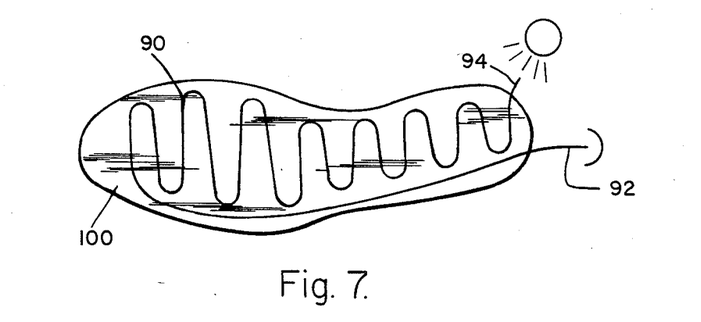
FIG. 7 is a cross-sectional view of the optic fiber embedded into the sole of a shoe.

Another application for the force measuring techniques of the present invention is disclosed in FIGS. 6 and 7. In this application, the optic fiber 90 is embedded into the sole 100 of a shoe. The input end 94 of the optic fiber is once again exposed to a light source and the output end 92 can be exposed to a light receiver. The entire assembly can then be connected by cable 106 to an output transformer device 104.

Through use of this alternative application, vertical forces in shoes due to walking, running, exercising, etc. can be measured by the method previously described. Although discrete microbending fixtures could be embedded in the sole 100, the distributed microbending fixtures formed into the sole 100, comparable to those disclosed in FIG. 5, are more practical.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described, of which the apparatus and method shown is intended only for illustration and for disclosure of an operative embodiment and method and not to show all of the various forms of modification in which the invention might be embodied or operated.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An apparatus for measuring the weight of a vehicle in motion comprising:
   a. a substantially flat pad;
   b. said pad being substantially rectangular in shape;
   c. said pad containing a first ramp on one of its lengthwise sides and a second ramp on its other lengthwise side;
   d. an optic fiber embedded into said pad with the leading end and the trailing end of the optic fiber protruding from said pad;
   e. a multiplicity of microbending fixtures distributed along the length of said optic fiber at spaced locations. apart from each other;
   f. a light source located at the leading end of said optic fiber;
   g. a light receiver located at the trailing end of said optic fiber;
   h. said light receiver connected to an output transformer; and
   i. said first ramp and said second ramp containing a data trigger and velocity sensing system which turns the light source, the light receiver, and the output transformer on when a vehicle runs over the first ramp and off when a vehicle runs over the second ramp;
   j. whereby when said pad is placed on a roadway and when a force is exerted on said pad by a vehicle running over it, said discrete microbending fixtures are caused to pinch said optic fiber and thereby attenuate the light transmitted from said light source to said light receiver, and said output transformer can calculate the force exerted on said pad and therefore the weight of the vehicle by knowing the light input from the light source and the light ouput received by the light receiver.

2. The invention as defined in claim 1 wherein the length of said pad is approximately equal to the width of a lane on a roadway, and the width of said pad is less than the distance between adjacent axles of a vehicle.

3. The invention as defined in claim 1 wherein said optic fiber is caused to be bent into a series of loops so that the optic fiber extends along the entire length and width of the pad.

4. The invention as defined in claim 1 wherein said pad is made of rubber.

5. An apparatus for measuring the weight of a vehicle in motion comprising:
   a. a substantially flat pad;
   b. said pad being substantially rectangular in shape;
   c. said pad containing a first ramp on one of its lengthwise sides and a second ramp on its other lengthwise side;
   d. an optic fiber embedded into said pad with the leading end and the trailing end of the optic fiber protruding from said pad;
   e. a multiplicity of internal protrusions located within said pad and located along the path of said optic fiber;
   f. said internal protrusions located above and below said optic fiber and spaced apart from each other along the path of the optic fiber;
   g. a light source located at the leading end of said optic fiber;
   h. a light receiver located at the trailing end of said optic fiber;
   i. said light receiver connected to an output transformer; and
   j. said first ramp and said second ramp containing a data trigger and velocity sensing system which turn the light source, the light receiver, and the output transformer on when a vehicle runs over the first ramp and off when a vehicle runs over the second ramp;
   k. whereby when said pad is placed on a roadway and when a force is exerted on said pad by a vehicle running over it, said internal protrusions in said pad are caused to pinch said optic fiber and thereby attenuate the light transmitted from said light source to said light receiver, and said output transformer can calculate the force exerted on said pad and therefore the weight of the vehicle by knowing the light input from the light source and the light output received by the light receiver.

6. The invention as defined in claim 5 wherein the length of said pad is approximately equal to the width of a lane on a roadway, and the width of said pad is less than the distance between adjacent axles of a vehicle.

7. The invention as defined in claim 5 wherein said optic fiber is caused to be bent into a series of loops so that the optic fiber extends along the entire length and width of the pad.

8. The invention as defined in claim 5 wherein said pad is made of rubber.

9. An apparatus for measuring the weight of a vehicle in motion comprising:
   a. substantially flat pad;
   b. said pad being substantially rectangular in shape;
   c. said pad containing a first ramp on one of its lengthwise sides and a second ramp on its other lengthwise side;
   d. an optic fiber embedded into said pad with the leading end and the trailing end of the optic fiber protruding from said pad;
   e. said optic fiber being bent into a series of loops so that the optic fiber extends along the entire length and width of the pad and also is caused to be looped both over and under itself so that there are numerous intersection points along the length of the optic fiber;
   f. a light source located at the leading end of said optic fiber;
   g. a light receiver located at the trailing end of said optic fiber;
   h. said light receiver connnected to an output transformer; and
   i. said firt ramp and said second ramp containing a data trigger and velocity sensing system which turn the light source, the light receiver, and the output transformer on when a vehicle runs over the first ramp and off when a vehicle runs over the second ramp;

j. whereby when said pad is placed on a roadway and when a force is exerted on said pad by a vehicle running over it, said optic fiber is pinched at the location of the intersections where the optic fiber is caused to run over or under itself and thereby attenuate the light transmitted from said light source to said light receiver, and said output transformer can calculate the force exerted on said pad and therefore the weight of the vehicle by knowing the light input from the light source and the light output received by the light receiver.

10. The invention as defined in claim 9 wherein the length of said pad is approximately equal to the width of a lane on a roadway, and the width of said pad is less than the distance between adjacent axles of a vehicle.

11. The invention as defined in claim 9 wherein said pad is made of rubber.

12. An apparatus for measuring the force exerted on a shoe comprising:

a. an optic fiber embedded in the sole of a shoe with the leading end and the trailing end of the optic fiber protruding from the sole of the shoe;

b. said optic fiber being bent into a series of loops so that the optic fiber extends along the entire length and width of the sole of the shoe;

c. a light source located at the leading end of said optic fiber;

d. a light receiver located at the trailing end of said optic fiber;

e. said light receiver connected to an output transformer;

f. the sole of the shoe further comprising a data trigger and velocity sensing system which turns the light source, the light receiver, and the output transformer on when a force is exerted on the shoe when the individual wearing the shoe walks or runs and which turns the light source, the light receiver, and the output transformer off when this force is removed; and g. said output transformer located in a pack which can be worn by the individual wearing the shoe;

h. whereby forces exerted on said shoe when the individual wearing the shoe walks or runs can be measured by the pinching on the optic fiber due to the force, which causes attenuation of the light transmitted from said light source to said light receiver, and said output transformer can calculate the force exerted on the shoe by knowing the light input from the light source and the light output received by the light receiver.

* * * * *